US011798288B2

(12) United States Patent
Park et al.

(10) Patent No.: US 11,798,288 B2
(45) Date of Patent: Oct. 24, 2023

(54) SYSTEM AND METHOD FOR GENERATING A TRAINING SET FOR IMPROVING MONOCULAR OBJECT DETECTION

(71) Applicant: Toyota Research Institute, Inc., Los Altos, CA (US)

(72) Inventors: Dennis Park, Fremont, CA (US); Rares A. Ambrus, San Francisco, CA (US); Vitor Guizilini, Santa Clara, CA (US); Jie Li, Los Altos, CA (US); Adrien David Gaidon, Mountain View, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 206 days.

(21) Appl. No.: 17/329,922

(22) Filed: May 25, 2021

(65) Prior Publication Data

US 2022/0300746 A1    Sep. 22, 2022

Related U.S. Application Data

(60) Provisional application No. 63/161,735, filed on Mar. 16, 2021.

(51) Int. Cl.
*G06V 20/58* (2022.01)
*G06T 7/50* (2017.01)
(Continued)

(52) U.S. Cl.
CPC ............ *G06V 20/58* (2022.01); *G01S 17/42* (2013.01); *G01S 17/89* (2013.01); *G01S 17/931* (2020.01);
(Continued)

(58) Field of Classification Search
None
See application file for complete search history.

(56) References Cited

U.S. PATENT DOCUMENTS

| 9,576,201 | B2 * | 2/2017 | Wu | G06V 10/809 |
| 2021/0225005 | A1 * | 7/2021 | Vartakavi | G06V 10/776 |
| 2022/0300746 | A1 * | 9/2022 | Park | G01S 7/4802 |

FOREIGN PATENT DOCUMENTS

| GB | 2593717 A * | 10/2021 | ......... G06K 9/00671 |
| WO | WO-2021198666 A1 * | 10/2021 | ......... G06K 9/00671 |

OTHER PUBLICATIONS

Wang et al., "Frustum ConvNet: Sliding Frustums to Aggregate Local Point-Wise Features for Amodal 3D Object Detection," 8 pages, proarXiv: 1903.01864v2 [cs.CV] Aug. 14, 2019.

(Continued)

*Primary Examiner* — Tahmina N Ansari

(74) *Attorney, Agent, or Firm* — Christopher G. Darrow; DARROW MUSTAFA PC

(57) ABSTRACT

Described are systems and methods for self-learned label refinement of a training set. In on example, a system includes a processor and a memory having a training set generation module that causes the processor to train a model using an image as an input to the model and 2D bounding based on 3D bounding boxes as ground truths, select a first subset from predicted 2D bounding boxes previously outputted by the model, retrain the model using the image as the input and the first subset as ground truths, select a second set of predicted 2D bounding boxes previously outputted by the model, and generate the training set by selecting the 3D bounding boxes from a master set of 3D bounding boxes that have corresponding 2D bounding boxes that form the second subset.

20 Claims, 8 Drawing Sheets

(51) Int. Cl.
*G01S 17/931* (2020.01)
*G06T 7/11* (2017.01)
*G06V 10/46* (2022.01)
*G06V 20/56* (2022.01)
*G01S 17/42* (2006.01)
*G01S 17/89* (2020.01)
*G06N 3/04* (2023.01)
*G06N 3/08* (2023.01)
*G06T 7/10* (2017.01)
*G06N 20/00* (2019.01)
*G06V 10/75* (2022.01)
*G06F 18/21* (2023.01)
*G06F 18/25* (2023.01)
*G06F 18/2113* (2023.01)
*G06F 18/214* (2023.01)

(52) U.S. Cl.
CPC ........ *G06F 18/217* (2023.01); *G06F 18/2113* (2023.01); *G06F 18/2155* (2023.01); *G06F 18/251* (2023.01); *G06N 3/04* (2013.01); *G06N 3/08* (2013.01); *G06N 20/00* (2019.01); *G06T 7/10* (2017.01); *G06T 7/11* (2017.01); *G06T 7/50* (2017.01); *G06V 10/462* (2022.01); *G06V 10/757* (2022.01); *G06V 20/56* (2022.01); *G06T 2207/10024* (2013.01); *G06T 2207/10028* (2013.01); *G06T 2207/20016* (2013.01); *G06T 2207/20081* (2013.01); *G06T 2207/20084* (2013.01); *G06T 2207/30248* (2013.01)

(56) References Cited

OTHER PUBLICATIONS

Mousavian et al., "3D Bounding Box Estimation Using Deep Learning and Geometry," IEEE Conference on Computer Vision and Pattern Recognition (CVPR) 2017, 9 pages.
Simonelli et al., "Demystifying Pseudo-LiDAR for Monocular 3D Object Detection," 12 pages, arXiv:2012.05796v1 [cs.CV] Dec. 10, 2020.
Zhu et al., "Cross-Modality 3D Object Detection," pp. 9876-9885, arXiv:2008.10436v1 [cs.CV] Aug. 16, 2020.
Weng et al., "Monocular 3D Object Detection with Pseudo-LiDAR Point Cloud," Proceedings of the IEEE/CVF International Conference on Computer Vision Workshops, 10 pages (2019).
You et al., "Pseudo-LIDAR++: Accurate Depth for 3D Object Detection in Autonomous Driving," 22 pages, arXiv:1906.06310v3 [cs.CV] Feb. 15, 2020.
Ma et al., "Rethinking Pseudo-lidar Representation," 21 pages, arXiv:2008.04582v1 [cs.CV] Aug. 11, 2020.
Zhou et al., "Objects as Points," 12 pages, arXiv:1904.07850v2 [cs.CV] Apr. 25, 2019.
Tian et al., "FCOS: A Simple and Strong Anchor-free Object Detector," 13 pages, arXiv:2006.09214v3 [cs.CV] Oct. 12, 2020.
Gahlert et al., "Cityscapes 3D: Dataset and Benchmark for 9 DoF Vehicle Detection," 10 pages, arXiv:2006.07864v1 [cs.CV] Jun. 14, 2020.
Eigen et al., "Depth Map Prediction from a Single Image using a Multi-Scale Deep Network," 9 pages, arXiv:1406.2283v1 [cs.CV] Jun. 9, 2014.
Godard et al., "Digging into self-supervised monocular depth estimation," Proceedings of the IEEE/CVF International Conference on Computer Vision (ICCV), 2019, pp. 3828-3838.
Guizilini et al. "3D Packing for Self-Supervised Monocular Depth Estimation" In IEEE Conference on Computer Vision and Pattern Recognition (CVPR), pp. 2485-2494 (2020).
Lin et al., "Feature Pyramid Networks for Object Detection," Proceedings of the IEEE Conference on Computer Vision and Pattern Recognition (CVPR), 2017, pp. 2117-2125.
Manhardt et al. "ROI-10D: Monocular Lifting of 2D Detection to 6D Pose and Metric Shape" In Proceedings of the IEEE/CVF Conference on Computer Vision and Pattern Recognition, pp. 2069-2078 (2019).
Pillai et al. "Superdepth: Self-Supervised, Super-Resolved Monocular Depth Estimation" 7 pages, arXiv:1810.01849v1 [cs.CV] Oct. 3, 2018.
Simonelli et al., "Disentangling Monocular 3D Object Detection," Proceedings of the IEEE/CVF International Conference on Computer Vision (ICCV), 2019, pp. 1991-1999.
Tian et al., "FCOS: Fully Convolutional One-Stage Object Detection," Proceedings of the IEEE/CVF International Conference on Computer Vision (ICCV), 2019, pp. 9627-9636.
Ummenhofer et al. "DeMoN: Depth and Motion Network for Learning Monocular Stereo" In IEEE Conference on computer vision and pattern recognition (CVPR), vol. 5, 10 pages (2017).
Vijayanarasimhan et al., "SfMV-Net: Learning of Structure and Motion from Video," 9 pages, arXiv:1704.07804v1 [cs.CV] Apr. 25, 2017.
Zhou et al., "Stereo Magnification: Learning view synthesis using multiplane images," 12 pages, arXiv:1805.09817v1 [cs.CV] May 24, 2018.

\* cited by examiner

SYSTEM AND METHOD FOR GENERATING A TRAINING SET FOR IMPROVING MONOCULAR OBJECT DETECTION

CROSS-REFERENCE TO RELATED APPLICATION

This application claims the benefit of U.S. Provisional Patent Application No. 63/161,735, entitled "MONOCULAR DEPTH PRE-TRAINING FOR END-TO-END 3D DETECTION," filed Mar. 16, 2021, which is incorporated by reference herein in its entirety.

TECHNICAL FIELD

The subject matter described herein relates, in general, to systems and methods for self-learned label refinement for improving monocular object detection.

BACKGROUND

The background description provided is to present the context of the disclosure generally. Work of the inventor, to the extent it may be described in this background section, and aspects of the description that may not otherwise qualify as prior art at the time of filing, are neither expressly nor impliedly admitted as prior art against the present technology.

Some neural network models can perform three-dimensional ("3D") monocular object detection. Moreover, these neural network models receive, as an input, an image captured by an imaging device, such as a camera. The neural network models have been trained to identify objects located within the image in a 3D space and generate appropriate 3D bounding boxes around these images. This is particularly challenging because the input images, by their very nature, are two-dimensional ("2D").

These neural network models may be trained in a variety of different ways. For supervised training, which requires a training set that has been annotated and acts as a ground truth, the accuracy of the annotations within the training set directly impacts the training and thus the performance of these neural networks. Compounding this problem is that training sets for training a model that performs monocular 3D object detection are very expensive to generate, as the annotation must identify the 3D location of the object on a 2D plane that is the image.

To generate the 3D location of an object, some annotations are based on point cloud information captured from a light detection and ranging (LIDAR) sensor. While these training sets may provide useful data for generating annotations, they suffer from drawbacks. For example, the LIDAR sensor used to capture point cloud information and the camera utilized to capture the corresponding image may not be precisely aligned, resulting in parallax issues. Additionally, the timing regarding when the point cloud was generated by the LIDAR sensor and when the camera captured the image may not be precisely synchronized, resulting in synchronization issues. Parallax in synchronization issues may result in the generation of faulty annotations. Using training sets that contain faulty annotations to train a model may impact the ultimate performance of the model.

SUMMARY

This section generally summarizes the disclosure and is not a comprehensive explanation of its full scope or all its features.

In one embodiment, a system for filtering and refining labels of a training set includes a processor and a memory in communication with the processor. The memory includes a training set generation module with instructions that cause the processor to generate a training set of 3D bounding boxes by filtering out 3D bounding boxes from a master set. To achieve this, the training set generation module causes the processor to generate 2D bounding boxes of objects in an image based on the master set of 3D bounding boxes of the objects and train a model using the image as an input and the 2D bounding boxes as ground truths. The model outputs a first set of predicted 2D bounding boxes and confidence scores for the first set of predicted 2D bounding boxes during the training.

Next, the training set generation module causes the processor to select, based on the confidence scores for the first set of predicted 2D bounding boxes, a first subset from the first set of predicted 2D bounding boxes, and retrain the model using the image as the input and the first subset as ground truths. The model outputs a second set of predicted 2D bounding boxes and confidence scores for the second set of predicted 2D bounding boxes during the retraining.

The training set generation module then causes the processor to select, based on the confidence scores for the second set of predicted 2D bounding boxes, a second subset of predicted 2D bounding boxes from the second set and generate the training set by selecting the 3D bounding boxes from the master set of 3D bounding boxes that have corresponding 2D bounding boxes that form the second subset.

In another embodiment, a method for filtering and refining labels of a training set includes the steps of generating 2D bounding boxes of objects in an image based on a master set of 3D bounding boxes of the objects and training a model using the image as an input and the 2D bounding boxes as ground truths. The model outputs a first set of predicted 2D bounding boxes and confidence scores for the first set of predicted 2D bounding boxes.

Next, the method performs the steps of selecting, based on the confidence scores for the first set of predicted 2D bounding boxes, a first subset from the first set of predicted 2D bounding boxes, and retraining the model using the image as the input and the first subset as ground truths. Again, the model outputs a second set of predicted 2D bounding boxes and confidence scores for the second set of predicted 2D bounding boxes.

The method then performs the steps of selecting, based on the confidence scores for the second set of predicted 2D bounding boxes, a second subset of predicted 2D bounding boxes from the second set of predicted 2D bounding boxes, and generating the training set by selecting the 3D bounding boxes from the master set of 3D bounding boxes that have corresponding 2D bounding boxes that form the second subset.

In yet another embodiment, a method for filtering and refining labels of a training set may include the step of training a model using an image as an input and 2D bounding boxes that are based on a master set of 3D bounding boxes as ground truths, wherein the model outputs a set of predicted 2D bounding boxes and confidence scores for the set of predicted 2D bounding boxes. Next, the method may then perform the step of selecting, based on the confidence scores for the first set of predicted 2D bounding boxes, a subset from the set of predicted 2D bounding boxes. After that, the method may then perform the step of generating the training set by selecting the 3D bounding boxes from the master set of 3D bounding boxes with corresponding 2D bounding boxes that form the subset.

Further areas of applicability and various methods of enhancing the disclosed technology will become apparent from the description provided. The description and specific examples in this summary are intended for illustration only and are not intended to limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements, or multiple elements may be designed as one element. In some embodiments, an element shown as an internal component of another element may be implemented as an external component and vice versa. Furthermore, elements may not be drawn to scale.

DETAILED DESCRIPTION

Described is a system and method for generating a training set by filtering and/or refining labels of the training set. The training set may then be used to train a monocular 3D object detection model. Moreover, in one example, the monocular 3D object detection model may identify, within an image captured by an imaging sensor, one or more objects in a 3D space. To achieve this, the monocular 3D object detection model may first need to be trained using ground truth 3D bounding boxes. However, as explained in the background section, ground truth 3D bounding boxes may be based on point cloud data captured from a LIDAR sensor and may suffer from parallax and/or synchronization issues.

The system and method described herein utilize a 2D object detection model to filter out 3D bounding boxes from a master set that may have errors due to parallax and/or synchronization issues. The system and method first convert the 3D bounding boxes from the master set into 2D bounding boxes that identify objects within the image. When generating the 2D bounding boxes, information regarding the relationship between a particular 2D bounding box and the 3D bounding box it is based upon may be captured and used later to select the appropriate 3D bounding boxes for training the monocular 3D object detection model.

Using the 2D bounding boxes as ground truths and the related image as an input, the 2D object detection model is trained, resulting in the 2D object detection model outputting a first set of predicted 2D bounding boxes and related confidence scores. This first set of predicted 2D bounding boxes is filtered using the confidence scores to create a subset. This subset is then utilized to retrain the 2D object detection model. Similarly, after retraining, the 2D object detection model outputs a second set of predicted 2D bounding boxes and related confidence scores. A second subset is selected from the second set of predicted 2D bounding boxes based on the confidence scores.

As such, the 2D bounding boxes that form the second subset are likely to be correctly identifying objects within the image in a 2D space. Using the 2D bounding boxes from the second subset, corresponding 3D bounding boxes from the master set are identified and selected to form the training set. By so doing, the 3D bounding boxes that have corresponding 2D bounding boxes from the second subset should be of higher quality and should not suffer as much from parallax and/or synchronization issues. The 3D bounding boxes that form the training set can then be used to train a monocular 3D object detection model.

Figure 1:
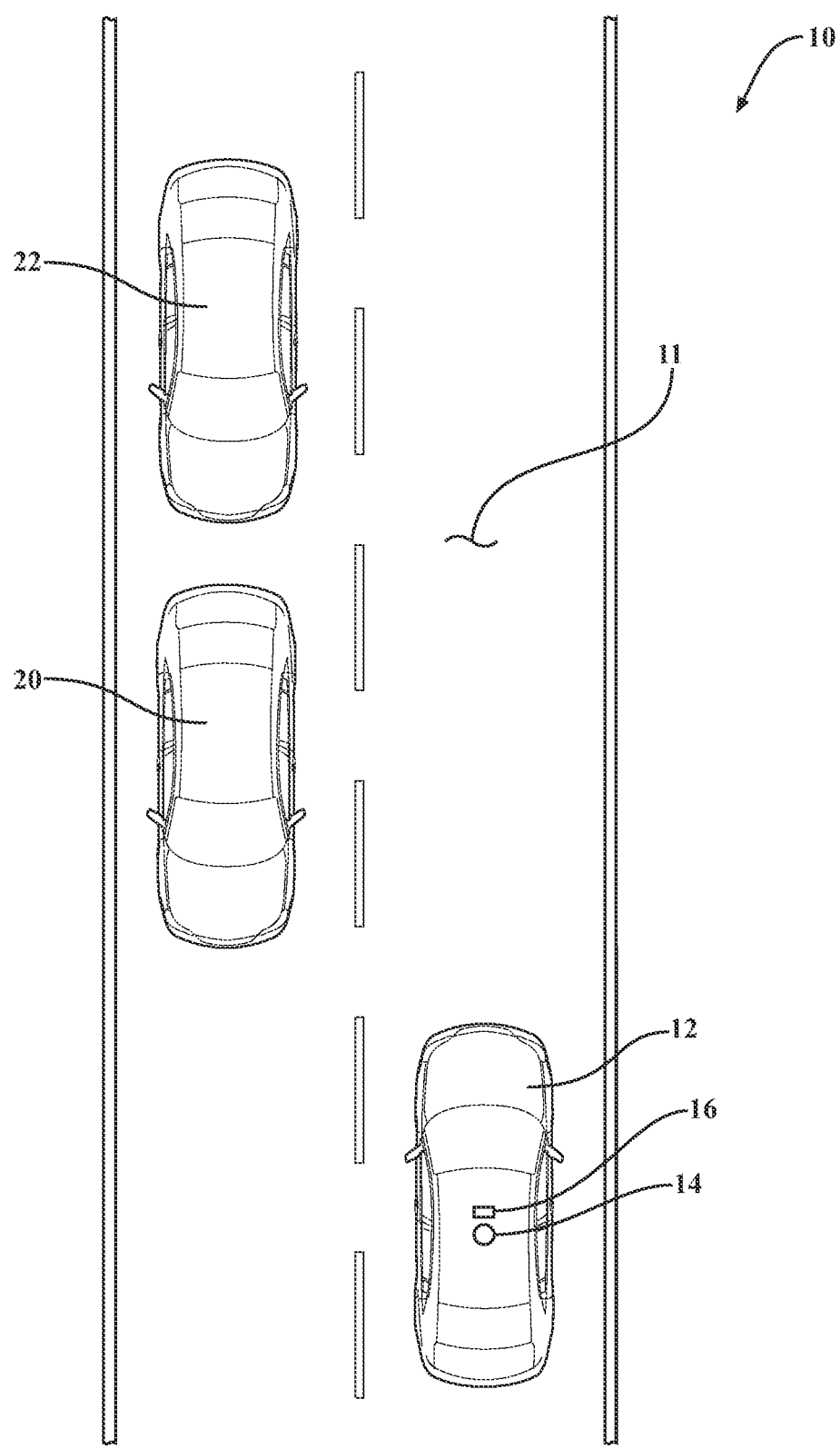
FIG. 1 illustrates a scene where data is collected using a LIDAR sensor and a camera to generate training data to train a model that performs 3D monocular object detection.

To better understand how the system and method operate, a description regarding how ground truth 3D bounding boxes are first generated will be described. Referring to FIG. 1, illustrated is a scene 10 that includes a road 11. Located on the road 11 is a vehicle 12 that includes a LIDAR sensor 14 and a camera sensor 16. The LIDAR sensor 14 can determine ranges by targeting an object with a laser and measuring the time for the reflected light to return to the receiver of the LIDAR sensor 14. In one example, the LIDAR sensor 14 may output ranges to objects in the form of a point cloud. The camera sensor 16 can be any type of imaging sensor and can capture images of the scene 10.

In this example, the scene 10 also includes vehicles 20 and 22 located on the road 11. Here, the LIDAR sensor 14 may output information that may be used to generate a point cloud that includes points representing the vehicles 20 and 22. Similarly, the camera sensor 16 may output an image that includes the vehicles 20 and 22. In this example, it is noted that there are some alignment issues regarding the LIDAR sensor 14 and the camera sensor 16. Moreover, the LIDAR sensor 14 and the camera sensor 16 are mounted to the vehicle 12 at slightly different locations. As such, this difference in alignment may cause parallax issues. In addition to parallax issues, it is noted that the camera sensor 16 and the LIDAR sensor 14 may capture images and point clouds, respectively, at slightly different moments in time, causing synchronization issues.

As explained previously, monocular 3D object detection models can receive an input image from an imaging sensor, such as a camera sensor, and output 3D bounding boxes that identify objects within the image in a 3D space. The 3D object detection models may be one or more neural networks that may need to undergo training. In one example, the 3D object detection models may be trained in a supervised fashion, wherein an image is provided to the 3D object detection model, which outputs predicted 3D bounding boxes of the objects within the image. The predicted 3D bounding boxes are then compared to ground truth 3D bounding boxes to generate a loss. Based on this loss, one or more model weights of the 3D object detection model are adjusted. Over the course of the training, the 3D object detection model's performance should improve over time.

Figure 2A:
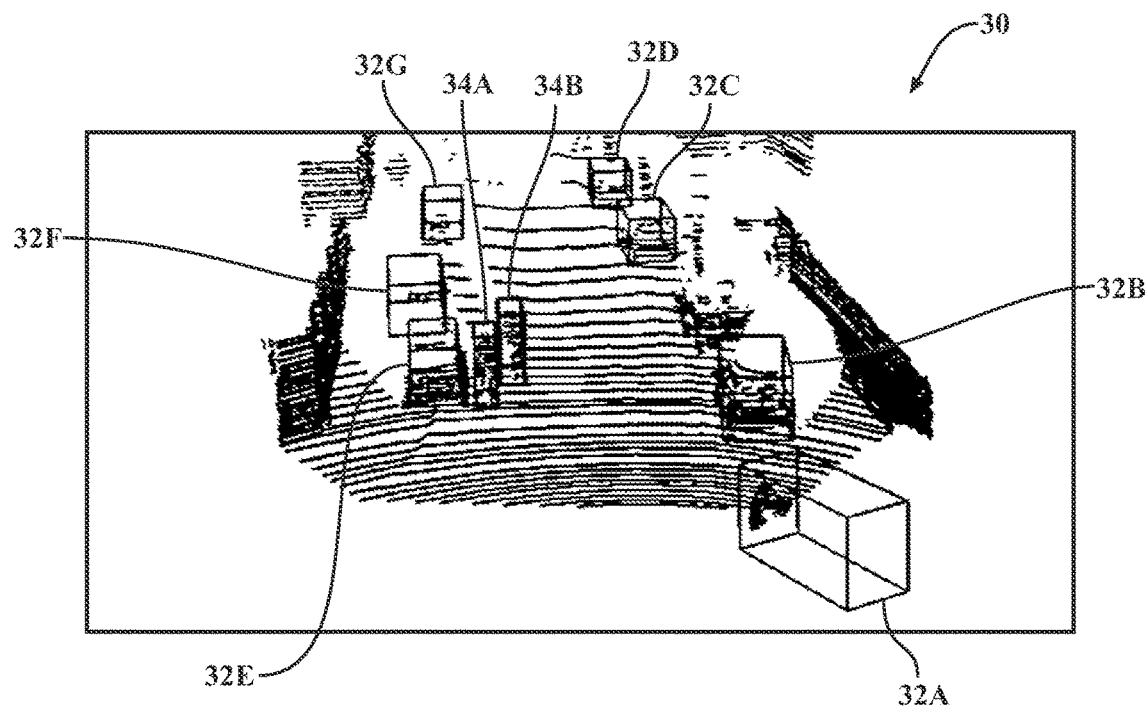
FIG. 2A illustrates a point cloud and 3D bounding boxes identifying objects generated from the point cloud.
Figure 2B:
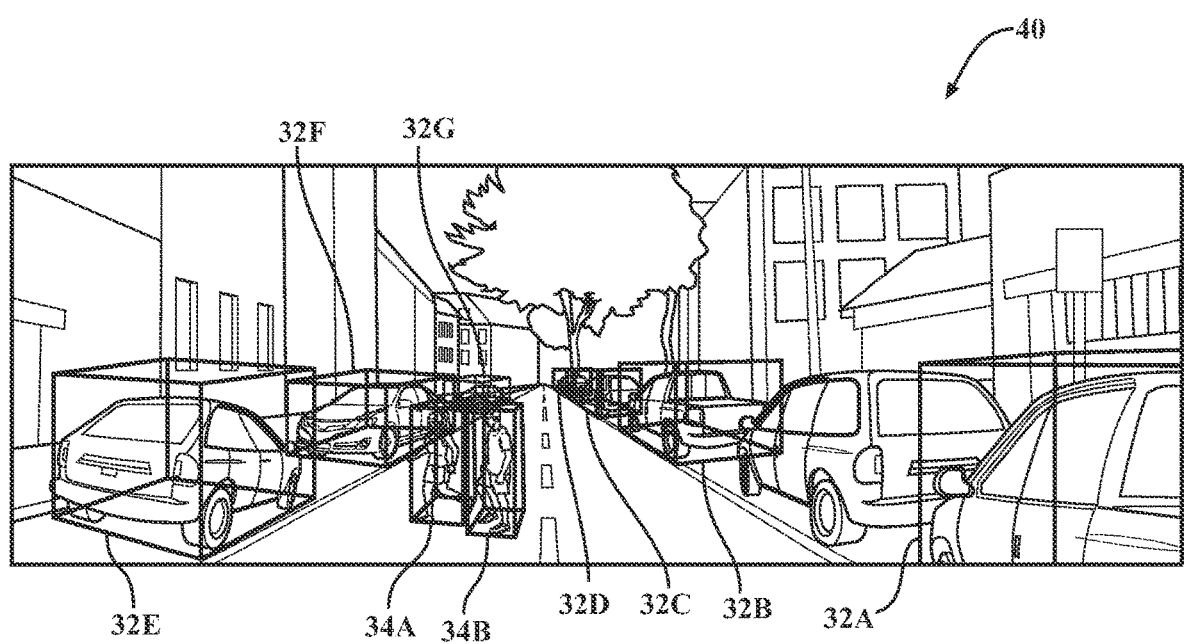
FIG. 2B illustrates an image that includes the 3D bounding boxes of FIG. 2A identifying objects located within the image.

The 3D bounding boxes used as ground truths to train the 3D object detection model are generally based on point cloud information generated by a LIDAR sensor, such as the LIDAR sensor 14. Moreover, referring to FIGS. 2A and 2B illustrated is one example of a point cloud 30 used to generate ground truth 3D bounding boxes and an image 40 for training purposes. Here, points of the point cloud 30 have been utilized to identify objects within the point cloud 30. In this example, objects within the point cloud 30 have been identified by 3D bounding boxes 32A-32E and 34A-34B. The 3D bounding boxes 32A-32E have been identified as vehicles, while the 3D bounding boxes 34A-34B have been identified as pedestrians. As best shown in FIG. 2B, the 3D bounding boxes 32A-32E and 34A-34B generated from points of the point cloud 30 have been overlaid into the image 40. In this example, a monocular 3D object detector model would be trained using the image 40 as an input to the model, and the 3D bounding boxes 32A-32E and 34A-34B act as ground truths for training the model in a supervised fashion.

Figure 3:
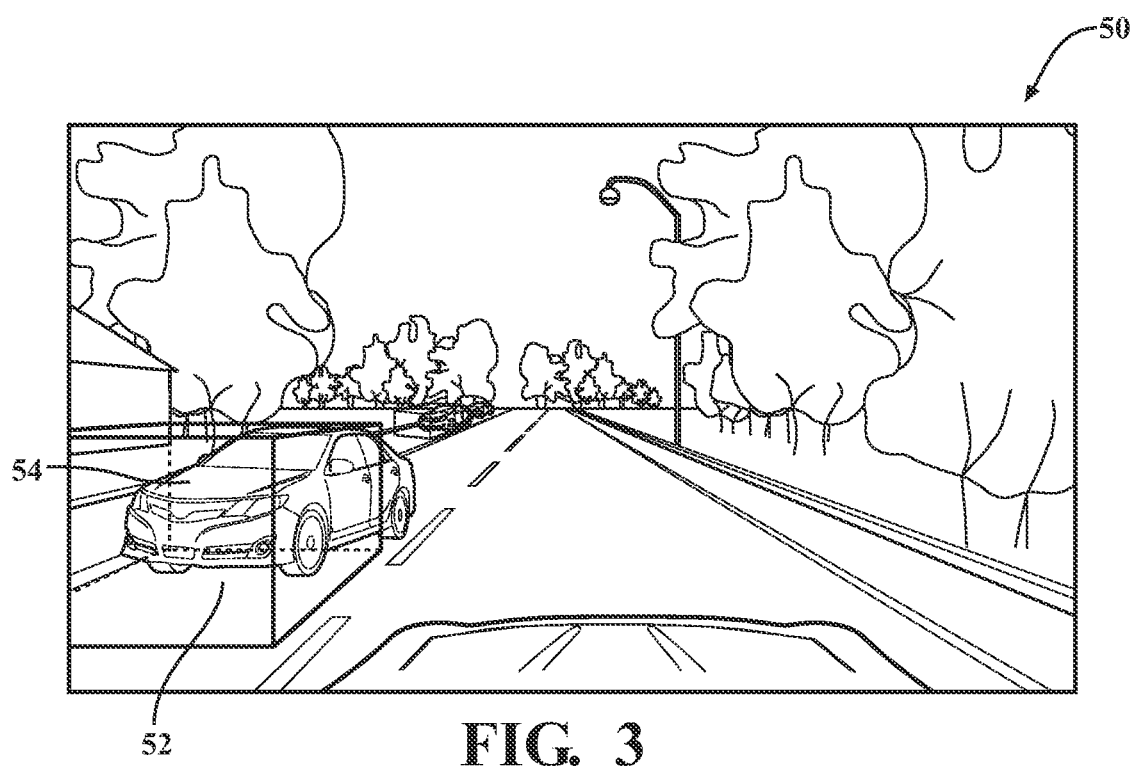
FIG. 3 illustrates one example of a 3D bounding box in an image that is poorly aligned with the object located within the image.

However, as stated previously, because the 3D bounding boxes that act as ground truths are based on point clouds generated by a LIDAR sensor, parallax and/or synchronization issues may be present. For example, FIG. 3 illustrates an image 50 including a vehicle 54. A 3D bounding box 52 is shown to be misaligned with the vehicle 54. The use of the 3D bounding box 52 to train a model may be counterproductive, as the 3D bounding box 52 does not align correctly with the vehicle 54.

Figure 4:
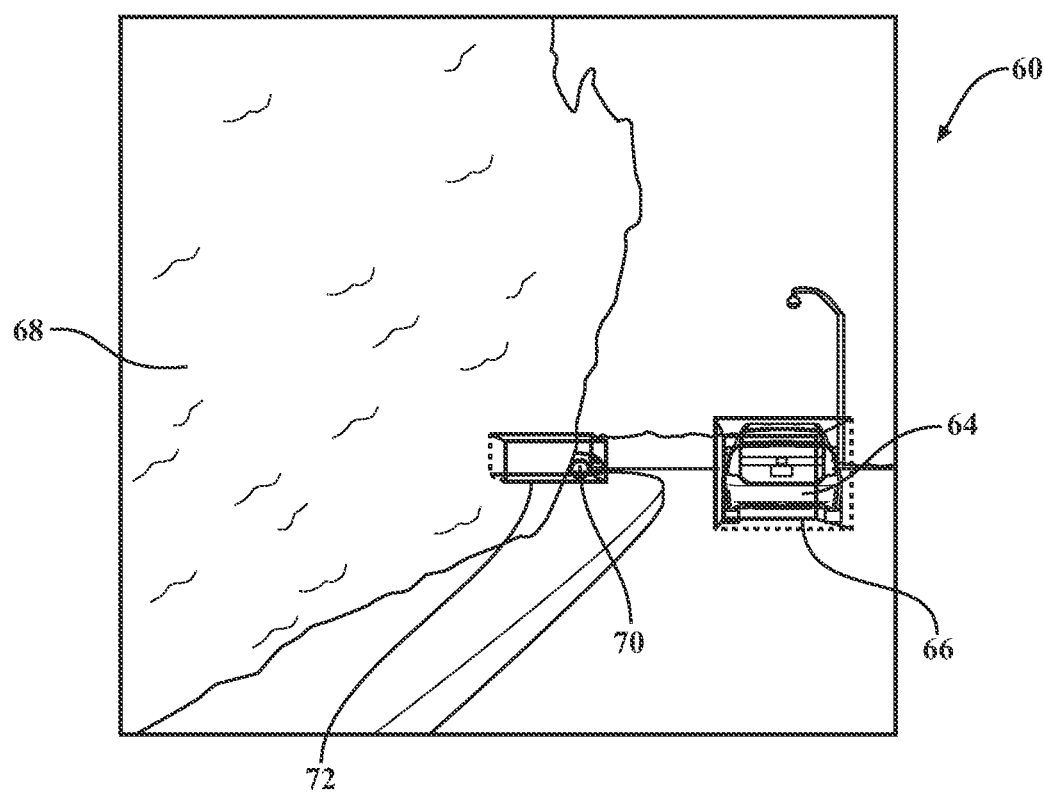
FIG. 4 illustrates another example of the 3D bounding box within an image that identifies an object obscured by other elements located within the image.

FIG. 4 illustrates another common issue. Here, an image 60 includes a vehicle 64 and a vehicle 70 identified by bounding boxes 66 and 72, respectively. Generally, the vehicle 64 is correctly identified by the bounding box 66. However, the vehicle 70 is obscured by foliage 68. As such, the vehicle 70 is not readily visible within the image 60 and would not be identifiable by a monocular 3D object detection model, regardless of the amount of training. As such, the use of the bounding box 72 to train a model may be counterproductive.

Figure 5:
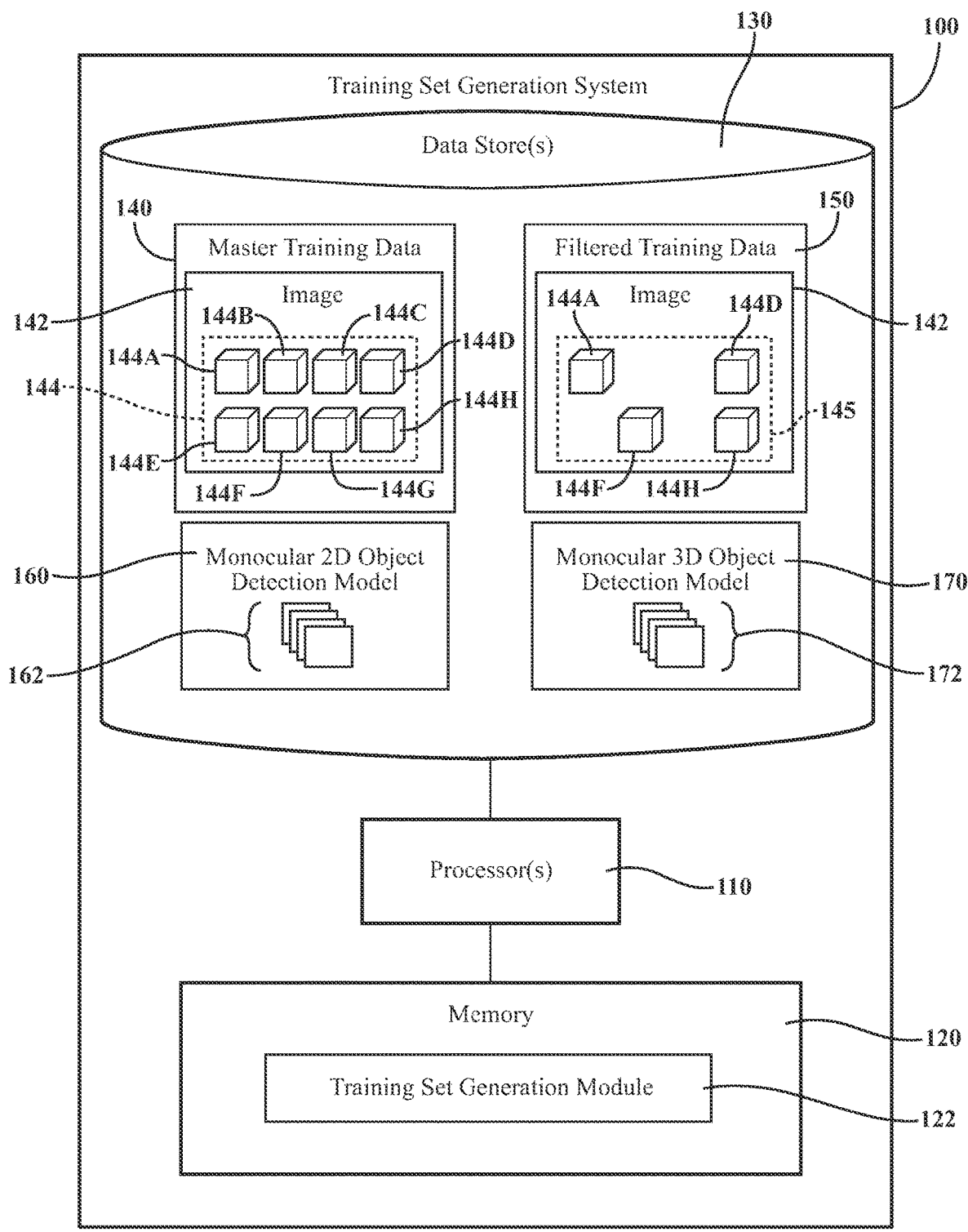
FIG. 5 illustrates a training set generation system for filtering out 3D bounding boxes within a master training set to generate a higher quality training set.

FIG. 5 illustrates a training set generation system 100 that can filter out 3D bounding boxes, such as those illustrated in FIGS. 3 and 4, to create a better training set. As shown, the training set generation system 100 includes one or more processor(s) 110. Accordingly, the processor(s) 110 may be a part of the training set generation system 100, or the training set generation system 100 may access the processor(s) 110 through a data bus or another communication path. In one or more embodiments, the processor(s) 110 is an application-specific integrated circuit that is configured to implement functions associated with a training set generation module 122. In general, the processor(s) 110 is an electronic processor such as a microprocessor that is capable of performing various functions as described herein. In one embodiment, the training set generation system 100 includes a memory 120 that stores the training set generation module 122. The memory 120 is a random-access memory (RAM), read-only memory (ROM), a hard disk drive, a flash memory, or other suitable memory for storing the training set generation module 122. The training set generation module 122 is, for example, computer-readable instructions that, when executed by the processor(s) 110, cause the processor(s) 110 to perform the various functions disclosed herein.

Furthermore, in one embodiment, the training set generation system 100 includes one or more data stores(s) 130. The data store(s) 130 is, in one embodiment, an electronic data structure such as a database that is stored in the memory 120 or another memory and that is configured with routines that can be executed by the processor(s) 110 for analyzing stored data, providing stored data, organizing stored data, generating stored data, and so on. Thus, in one embodiment, the data store(s) 130 stores data used by the training set generation module 122 in executing various functions. In one embodiment, the data store(s) 130 stores master training data 140 that may contain information to train a monocular 3D object detection model 170. Moreover, the master training data 140 may include an image 142 with a master set 144 of ground truth 3D bounding boxes 144A-144H that have been annotated to identify objects within the image 142.

The monocular 3D object detection model 170 may take any one of a number of different forms. In one example, the monocular 3D object detection model 170 may be one or more neural networks that can receive an image and output 3D bounding boxes that identify objects within the received image in a 3D space. The monocular 3D object detection model 170 may be utilized in a number of different applications. In one such application, the monocular 3D object detection model 170 may be utilized in an autonomous vehicle application.

As explained previously, some 3D bounding boxes that act as ground truths, such as some of the 3D bounding boxes 144A-144H of the master set 144, suffer from issues, such as parallax, synchronization, and other issues. As will be explained in this description, the training set generation module 122 causes the processor(s) 110 to utilize a monocular 2D object detection model 160 to filter out 3D bounding boxes 144A-144H of the master set 144 to generate the training set 145. In this example, the training set generation system 100 has filtered out several of the 3D bounding boxes from the master set 144, leaving the training set 145 with the 3D bounding boxes 144A, 144D, 144F, and 144H. The 3D bounding boxes 144A, 144D, 144F, and 144H were deemed by the training set generation system 100 to be of higher quality in that they do not suffer as much from parallax and/or synchronization issues and/or other issues. As such, filtered training data 150 for training would include the training set 145 and the image 142.

It is noted that the master training data 140 and the filtered training data 150 are shown to include a single image with multiple 3D bounding boxes identifying objects within the single image. However, it should be understood that the master train data 140 and/or the filtered training data 150 may include multiple images, each of which may have any number of bounding boxes acting as ground truths that identify objects within the images.

As such, the 3D bounding boxes 144A, 144D, 144F, and 144H, which form the training set 145, will be utilized to train the monocular 3D object detection model 170. In this example, the training of the monocular 3D object detection model 170 may be performed in a supervised fashion wherein a loss from a loss function is calculated and, based on that loss, one or more model weights 172 of the monocular 3D object detection model 170 will be adjusted. By filtering the master set 144 to generate the training set 145, the monocular 3D object detection model 170 will receive a higher quality training set, which will positively impact the performance of the monocular 3D object detection model 170.

Figure 6:
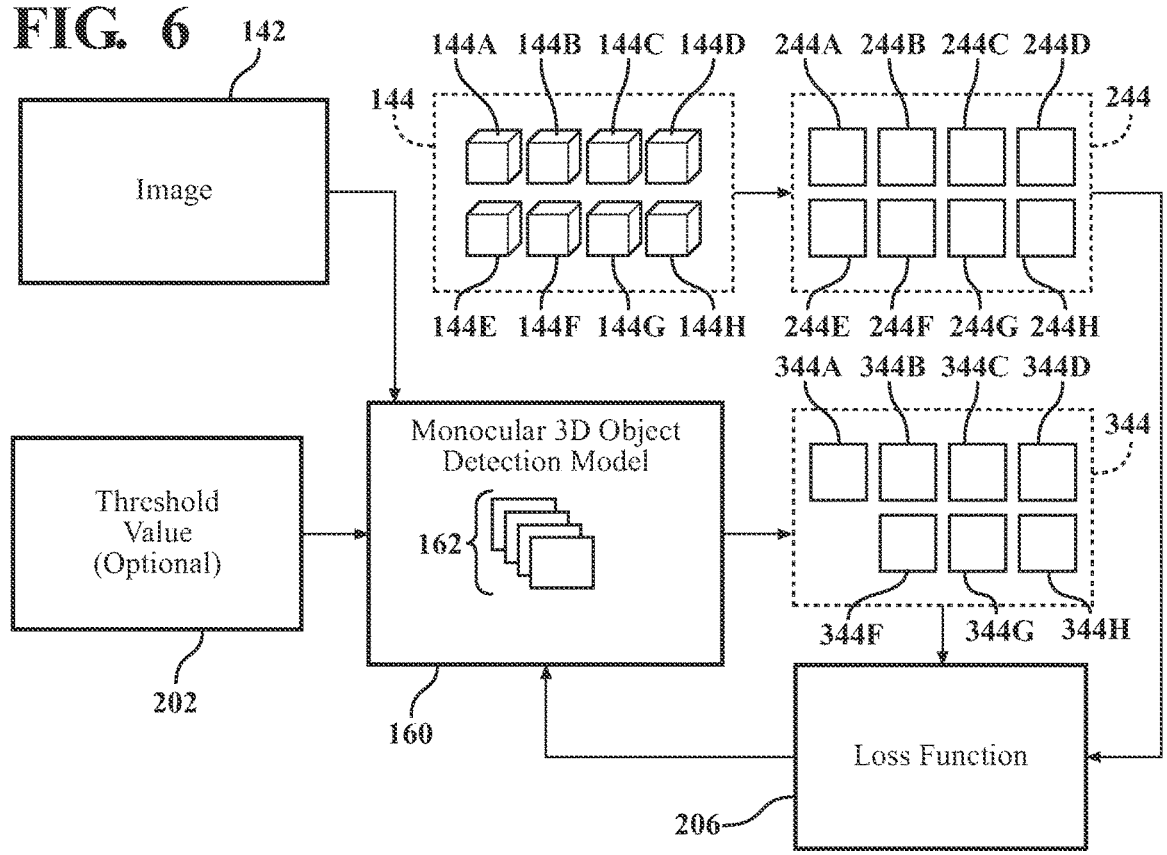
FIG. 6 illustrates a flowchart detailing an initial training of a 2D monocular object detection model used to filter out 3D bounding boxes within a master set to generate a higher quality training set.

To better understand this process, reference is made to FIG. 6, which illustrates a process flow. Here, the training set generation module 122 causes the processor(s) 110 to generate a set 244 of 2D bounding boxes 244A-244H of the objects in the image 142 based on the 3D bounding boxes 144A-144H of the master set 144. In addition, the training set generation module 122 may cause the processor(s) 110 to link the 2D bounding boxes 244A-244H to the corresponding 3D bounding box 144A-144H. In this example, the 2D bounding box 244A relates to the 3D bounding box 144A, the 2D bounding box 244B relates to the 3D bounding box 144B, and so on.

Figure 7:
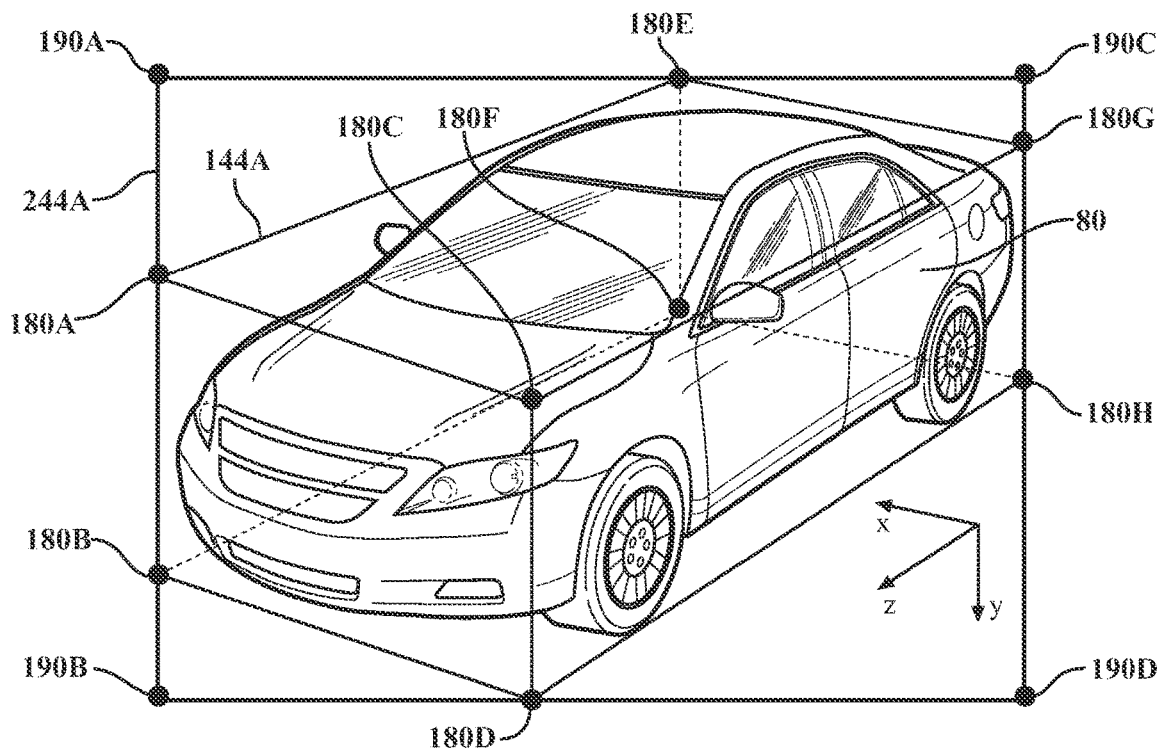
FIG. 7 illustrates an example of projecting a 2D bounding box based on a 3D bounding box.

The 2D bounding boxes 244A-244H can be generated by projecting the 3D bounding boxes 144A-144H of the objects onto an image plane of the image 142. Using this projection, the training set generation module 122 causes the processor(s) 110 to draw axis-aligned bounding boxes that encapsulate corners of the 3D bounding boxes 144A-144H to generate the 2D bounding boxes 244A-244H. For example, referring to FIG. 7, illustrated is the 3D bounding box 144A that outlines, in a 3D space, an object 80 using eight corners 180A-180H. In this example, the training set generation module 122 causes the processor(s) 110 to draw the 2D bounding box 244A defined by four corners 190A-190D that encapsulates the eight corners 180A-180H of the 3D bounding box 144A.

Once the 2D bounding boxes 244A-244H are generated, the monocular 2D object detection model 160 is trained using the image 142 as an input and the 2D bounding boxes 244A-244H as ground truths. Moreover, the monocular 2D object detection model 160 will output, using the image 142 as input, a set 344 of predicted 2D bounding boxes and confidence scores related to each of the predicted 2D bounding boxes. In this example, the monocular 2D object detection model 160 has output predicted 2D bounding boxes 344A-344D and 344F-344H, each having a confidence score. Additionally, the training set generation module 122 causes the processor(s) 110 to link the predicted 2D bounding boxes 344A-344D and 344F-344H with the corresponding 3D bounding boxes 144A-144H from the master set 144. This may be accomplished by utilizing linking information previously determined regarding the association between the 2D bounding boxes 244A-244H to the corresponding 3D bounding box 144A-144H.

Notably, the monocular 2D object detection model 160 did not output a bounding box for at least one object in the image 142. In some cases, this may be because the object that was not detected may be obscured, similar to what was described in FIG. 4, or have other issues preventing it from being detected by the monocular 2D object detection model 160.

Additionally, the monocular 2D object detection model 160 may also receive a threshold value 202. The threshold value 202 may provide a parameter value denoting the minimum confidence score of the 2D bounding boxes that the monocular 2D object detection model 160 will produce. The lower the threshold value 202 is, the more bounding boxes will be returned by the monocular 2D object detection model 160. As such, the threshold value 202 may be set such that only seven, instead of eight, predicted 2D bounding boxes 344A-344D and 344F-344H were returned.

Using the predicted 2D bounding boxes 344A-344D and 344F-344H of the set 344 and the 2D bounding boxes 244A-244H as ground truths, the training set generation module 122 may cause the processor(s) to utilize a loss function 206 to determine a loss. The loss will be utilized to adjust one or more model weights 162 of the monocular 2D object detection model 160 to improve the performance of the monocular 2D object detection model 160.

Brief mention is made regarding the monocular 2D object detection model 160. The monocular 2D object detection model 160 can be any type of monocular 2D object detection model that receives, as an input, an image and outputs one or more 2D bounding boxes that identify objects within the image. In one example, the monocular 2D object detection model 160 may be a fully convolutional one-stage object detector. However, any type of monocular 2D object detection model 160 may be utilized.

Once the predicted 2D bounding boxes 344A-344D and 344F-344H have been generated, the training set generation module 122 may cause the processor(s) 110 to select, based on the confidence scores, a subset from the predicted 2D bounding boxes 344A-344D and 344F-344H. Moreover, referring to FIG. 8, the processor(s) 110 has selected predicted 2D bounding boxes 344A-344D, 344F, and 344H to form a subset 345. In this example, the confidence scores associated with each of the predicted 2D bounding boxes 344A-344D, 344F, and 344H may be such that they indicate a strong likelihood that an object is located within the predicted 2D bounding boxes 344A-344D, 344F, and 344H.

The selection of the subset 345 may occur by having the processor(s) 110 rank the set 344 of predicted 2D bounding boxes 344A-344D and 344F-344H based on the confidence scores and selecting the subset 345 from the set 344. The subset 345 may include the predicted 2D bounding boxes 344A-344D and 344F-344H of the set 344 having confidence scores that satisfy a predefined threshold.

Using the subset 345, the training set generation module 122 may cause the processor(s) 110 to retrain the monocular 2D object detection model 160 using the image 142 as an input and the subset 345 that includes the predicted 2D bounding boxes 344A-344D, 344F, and 344H as ground truths. It should be understood that the term "retrain" or "retraining" can be interpreted the same as "train" or "training," respectively. Here, the 2D monocular 2D object detection model 160 outputs a set 444 of predicted 2D bounding boxes 444A, 444B, 444D, 444F, and 444H and related confidence scores. The training set generation module 122 may cause the processor(s) 110 to calculate a loss using the loss function 206. Based on this loss, the processor(s) 110 may adjust one or more model weights 162 of the 2D monocular 2D object detection model 160. Optionally, the monocular 2D object detection model 160 may receive a threshold value 202, explained previously.

Again, the training set generation module 122 causes the processor(s) 110 to link the predicted 2D bounding boxes 444A, 444B, 444D, 444F, and 444H with the corresponding 3D bounding boxes 144A-144H from the master set 144. As such, information regarding that predicted 2D bounding boxes 444A, 444B, 444D, 444F, and 444H correspond with the 3D bounding boxes 144A, 144B, 144D, 144F, and 144H is saved. Like, before this may be accomplished by utilizing linking information previously determined.

Figure 8:
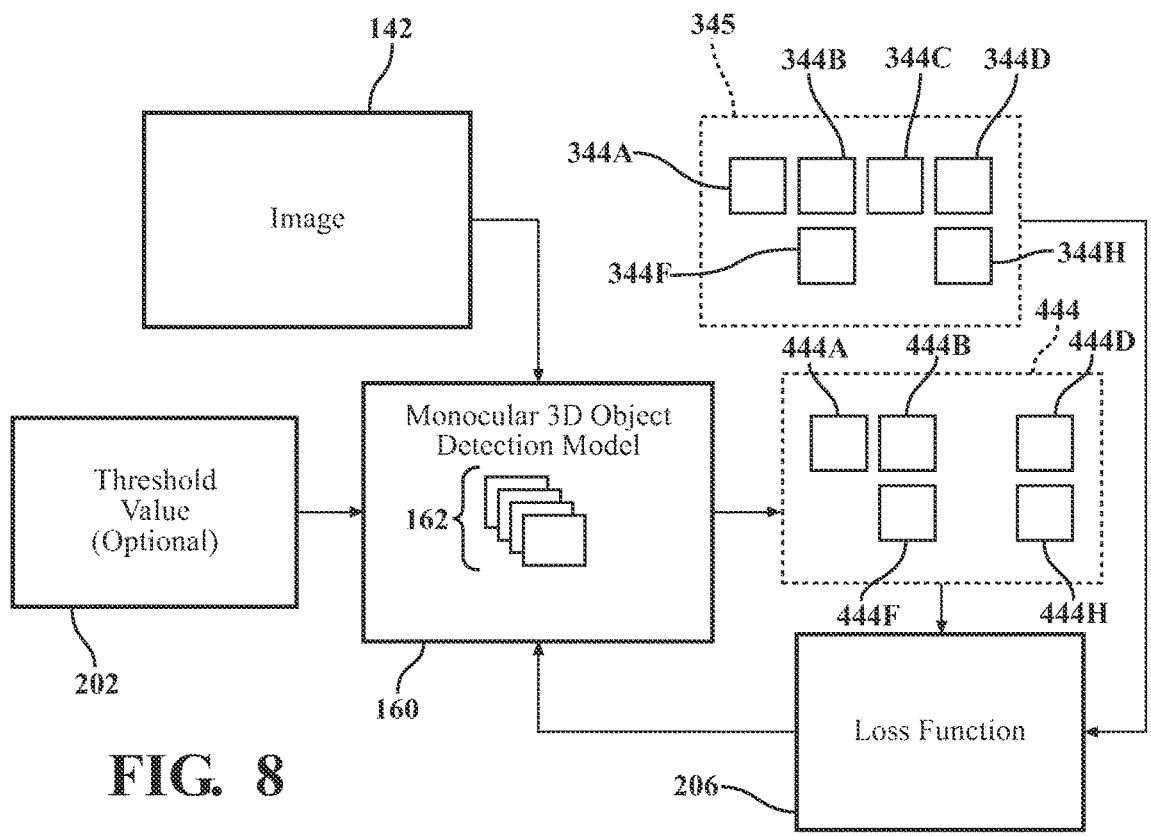
FIG. 8 illustrates a flowchart detailing a second training of the 2D monocular object detection model used to filter out 3D bounding boxes within a master set to generate a higher quality training set.

The training set generation module 122 can cause the processor(s) 110 to perform the retraining shown in FIG. 8 as many times as desired. For example, the training set generation module 122 can cause the processor(s) 110 to select another subset from the set 444 and perform additional retraining of the monocular 2D object detection model 160 in an iterative fashion. In this example, only one retraining has been illustrated, but it should be understood that the retraining illustrated in FIG. 8 may occur numerous times.

Figure 9:
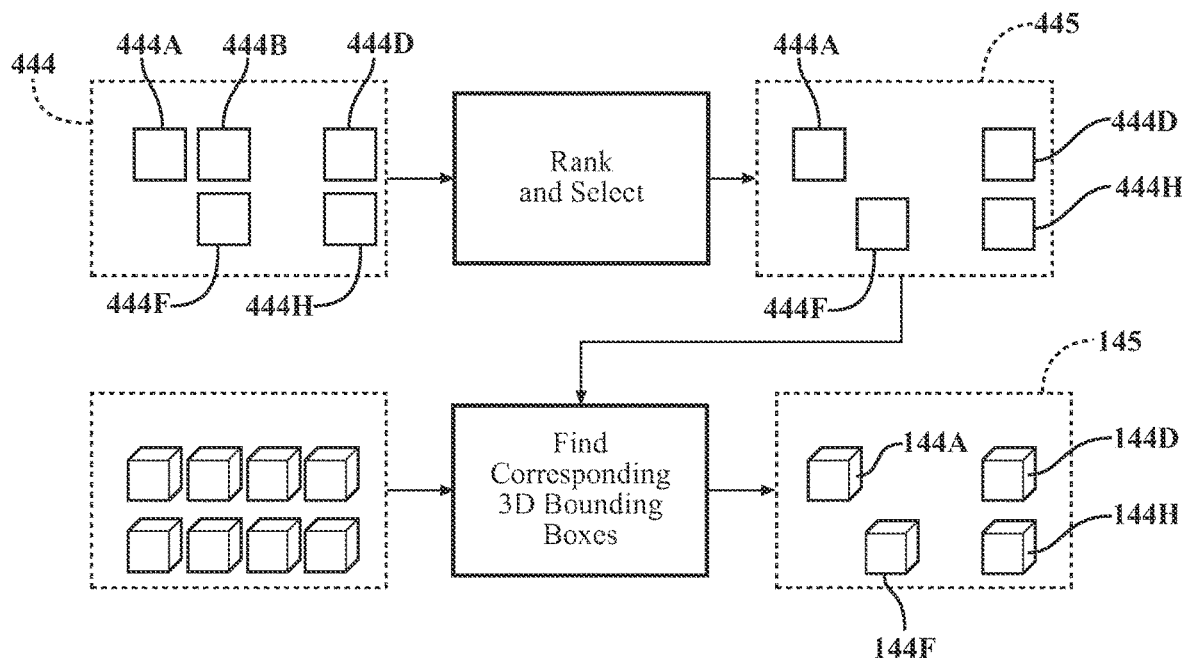
FIG. 9 illustrates a flowchart detailing the ranking and selecting of a portion of the 3D bounding boxes within a master set to generate a higher quality training set.

Referring to FIG. 9, the training set generation module 122 may cause the processor(s) 110 to select, based on the confidence scores for the predicted 2D bounding boxes 444A, 444B, 444D, 444F, and 444H, another subset 445 of predicted 2D bounding boxes 444A, 444D, 444F, and 444H. In this example, the confidence scores associated with each of the predicted 2D bounding boxes 444A, 444D, 444F, and 444H may be such that they indicate an even stronger likelihood that an object is located within the predicted 2D bounding boxes 444A, 444D, 444F, and 444H. Similar to selecting the subset 345, selecting the subset 445 may occur by having the processor(s) 110 rank the set 444 of predicted 2D bounding boxes 444A, 444B, 444D, 444F, and 444H based on the confidence scores and selecting the subset 445 from the set 444.

As such, the training set generation module 122 has caused the processor(s) 110 to identify the predicted 2D bounding boxes 444A, 444D, 444F, and 444H as having a strong likelihood that objects within the image 142 are located within this subset 445 of 2D bounding boxes. The training set 145 is then generated by finding which of the 3D bounding boxes 144A-144H relate to the predicted 2D bounding boxes 444A, 444D, 444F, and 444H. Here, the training set generation module 122 may cause the processor(s) 110 to select the 3D bounding boxes 144A, 144D, 144F, and 144H to form the training set 145 because they relate to the predicted 2D bounding boxes 444A, 444D, 444F, and 444H. This identifying of the corresponding 3D bounding boxes may occur by utilizing linking information previously discussed.

The 3D bounding boxes 144A, 144D, 144F, and 144H may then be stored within the filtered training data 150 to be utilized for training the monocular 3D object detection model 170. By utilizing and training the monocular 2D object detection model 160 to correctly determine the location of actual objects within the image 142 using ground truths that are based on the 3D bounding boxes 144A-144H, the training set generation system 100 can filter out 3D bounding boxes that do not correctly align with objects within the image 142 and/or are subject to synchronization errors, such as illustrated and explained in FIGS. 3 and 4.

Figure 10:
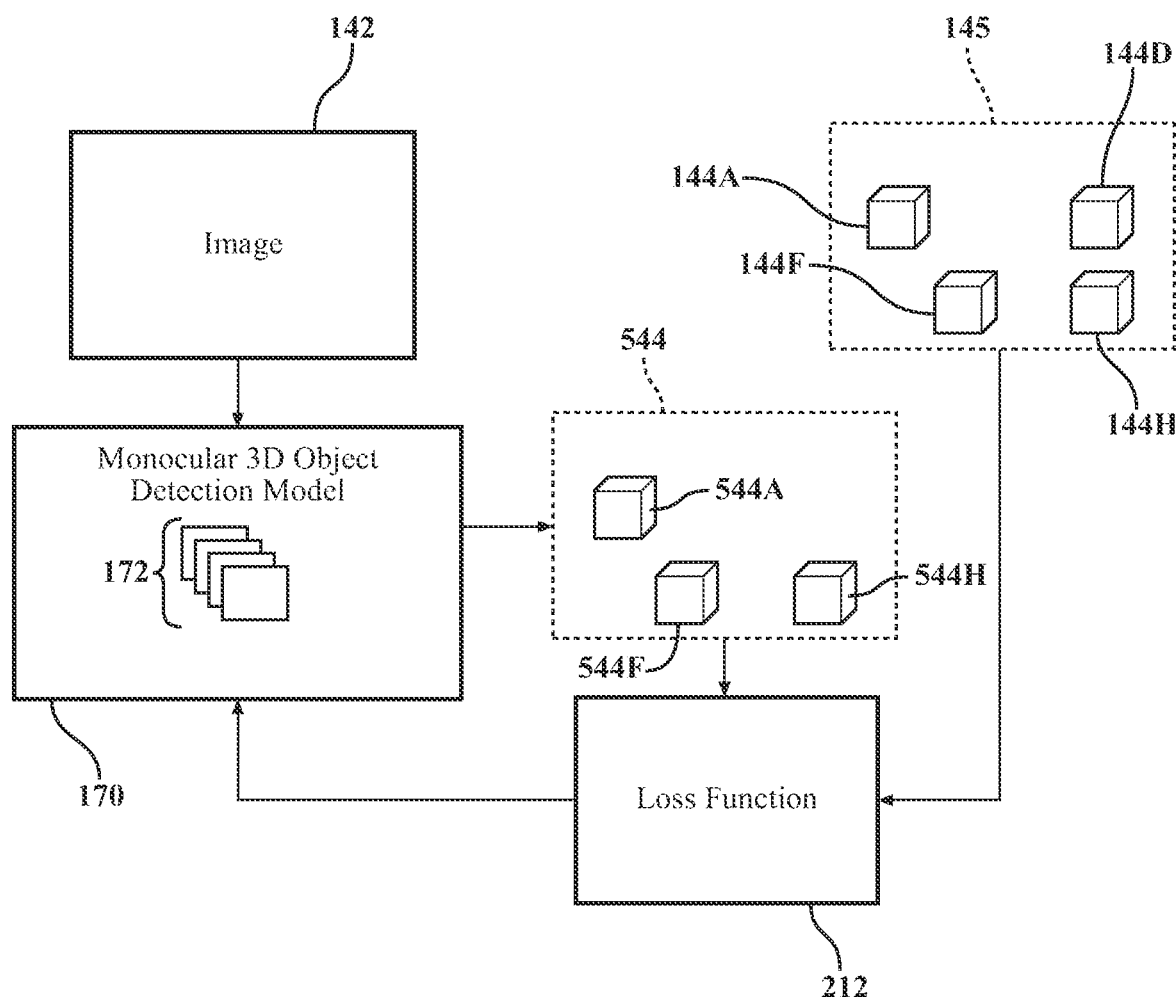
FIG. 10 illustrates a flowchart detailing the training of a 3D object detection model using a higher quality training set derived from a master set.

FIG. 10 illustrates the training of the monocular 3D object detection model 170 using the training set 145. It should be understood that the training of the monocular 3D object detection model 170 may be performed by the training set generation system 100 or may be performed by another system that simply utilizes the training set 145 that has been filtered to train the monocular 3D object detection model 170.

Here, the monocular 3D object detection model 170 receives the image 142 and outputs predicted 3D bounding boxes 544A, 544F, and 544H forming the set 544. The processor(s) 110 uses a loss function 212 to determine a loss between the predicted 3D bounding boxes 544A, 544F, and 544H and the 3D bounding boxes 144A, 144D, 144F, and 144H that act as ground truths. Using a loss, the processor(s) 110 may then adjust the model weights 172 of the monocular 3D object detection model to improve the performance of the monocular 3D object detection model 170.

As such, by training the monocular 3D object detection model 170 using a training data 150 that has been filtered from the master training data 140 using the training set generation system 100, the training data 150 will be populated with higher quality ground truth 3D bounding boxes that have reduced issues related to parallax in our synchronization errors. Ultimately, because the monocular 3D object detection model 170 will be trained with better training data, the monocular 3D object detection model will achieve improved performance.

Figure 11:
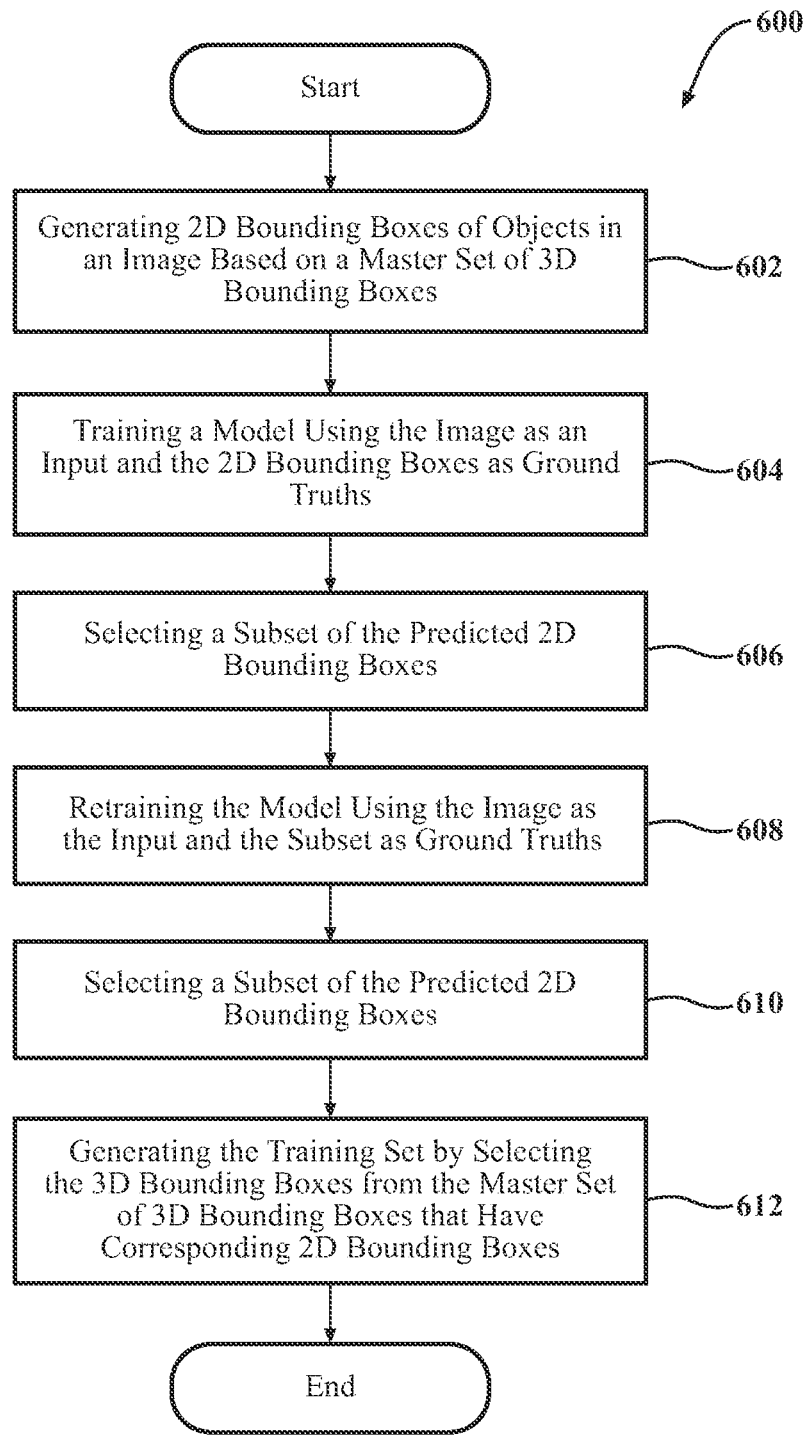
FIG. 11 illustrates a method for filtering out 3D bounding boxes within a master training set to generate a higher quality training set.

Referring to FIG. 11, a method 600 for generating a training set is shown. The method 600 will be described from the viewpoint of the training set generation system 100 of FIG. 5, with reference to the process flows illustrated in FIGS. 6, 8, and 9. However, it should be understood that this is just one example of implementing the method 600. While method 600 is discussed in combination with the training set generation system 100, it should be appreciated that the method 600 is not limited to being implemented within the training set generation system 100, but is instead one example of a system that may implement the method 600.

In step 602, the training set generation module 122 causes the processor(s) 110 to generate a set 244 of 2D bounding boxes 244A-244H of the objects in the image 142 based on the 3D bounding boxes 144A-144H of the master set 144. As explained previously, the 2D bounding boxes 244A-244H can be generated by projecting the 3D bounding boxes 144A-144H of the objects onto an image plane of the image 142. Using this projection, the training set generation module 122 causes the processor(s) 110 to draw axis-aligned bounding boxes that encapsulate corners of the 3D bounding boxes 144A-144H to generate the 2D bounding boxes 244A-244H.

In step 604, the training set generation module 122 causes the processor(s) 110 to train the monocular 2D object detection model 160 using the image 142 as an input and the 2D bounding boxes 244A-244H as ground truths. Moreover, the monocular 2D object detection model 160 will output, using the image 142 as input, a set 344 of predicted 2D bounding boxes and confidence scores related to each of the predicted 2D bounding boxes. In this example, the monocular 2D object detection model 160 has output predicted 2D bounding boxes 344A-344D and 344F-344H, each having a confidence score.

In step 606, training set generation module 122 may cause the processor(s) 110 to select, based on the confidence scores, a subset from the predicted 2D bounding boxes 344A-344D and 344F-344H. Moreover, referring to FIG. 8, the processor(s) 110 has selected predicted 2D bounding boxes 344A-344D, 344F, and 344H to form a subset 345. In this example, the confidence scores associated with each of the predicted 2D bounding boxes 344A-344D, 344F, and 344H may be such that they indicate a strong likelihood that an object is located within the predicted 2D bounding boxes 344A-344D, 344F, and 344H.

In step 608, the training set generation module 122 may cause the processor(s) 110 to retrain the monocular 2D object detection model 160 using the image 142 as an input and the subset 345 that includes the predicted 2D bounding boxes 344A-344D, 344F, and 344H as ground truths. Here, the 2D monocular 2D object detection model 160 outputs a set 444 of predicted 2D bounding boxes 444A, 444B, 444D, 444F, and 444H and related confidence scores. The training set generation module 122 can cause the processor(s) 110 to perform the retraining shown in FIG. 8 as many times as desired.

In step 610, the training set generation module 122 may cause the processor(s) 110 to select, based on the confidence scores for the predicted 2D bounding boxes 444A, 444B, 444D, 444F, and 444H, another subset 445 of predicted 2D bounding boxes 444A, 444D, 444F, and 444H.

In step 612, the training set generation module 122 may cause the processor(s) 110 to select the 3D bounding boxes 144A, 144D, 144F, and 144H to form the training set 145 because they relate to the predicted 2D bounding boxes 444A, 444D, 444F, and 444H. This identifying of the corresponding 3D bounding boxes may occur by utilizing linking information previously discussed. The 3D bounding boxes 144A, 144D, 144F, and 144H may then be stored within the filtered training data 150 to be utilized for training the monocular 3D object detection model 170.

As such, using the method 600, the training data 150 will be populated with higher quality ground truth 3D bounding boxes that have reduced issues related to parallax in our synchronization errors, leading to improved training of a monocular 3D object detection model.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-11, but the embodiments are not limited to the illustrated structure or application.

According to various embodiments, the flowcharts and block diagrams in the figures illustrate the architecture, functionality, and operation of possible implementations of systems, methods, and computer program products. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may be executed substantially concurrently, or the blocks may sometimes be executed in the reverse order, depending upon the functionality involved.

The systems, components, and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements can also be embedded in an application product that comprises all the features enabling the implementation of the methods described herein and can carry out these methods when loaded in a processing system.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Generally, module as used herein includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

As used herein, the terms "a" and "an" are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system comprising:
    a processor; and
    a memory in communication with the processor, the memory having a training set generation module having instructions that, when executed by the processor, cause the processor to:
    generate 2D bounding boxes of objects in an image based on a master set of 3D bounding boxes of the objects,
    train a model using the image as an input and the 2D bounding boxes as ground truths, wherein the model outputs a first set of predicted 2D bounding boxes and confidence scores for the first set of predicted 2D bounding boxes,
    select, based on the confidence scores for the first set of predicted 2D bounding boxes, a first subset from the first set of predicted 2D bounding boxes,
    retrain the model using the image as the input and the first subset as ground truths, wherein the model outputs a second set of predicted 2D bounding boxes and confidence scores for the second set of predicted 2D bounding boxes,
    select, based on the confidence scores for the second set of predicted 2D bounding boxes, a second subset of predicted 2D bounding boxes from the second set, and
    generate a training set by selecting the 3D bounding boxes from the master set of 3D bounding boxes that have corresponding 2D bounding boxes that form the second subset.

2. The system of claim 1, wherein the training set generation module further includes instructions that, when executed by the processor, cause the processor to project the 3D bounding boxes of the objects onto an image plane of the image to generate the 2D bounding boxes of the objects.

3. The system of claim 1, wherein the training set generation module further includes instructions that, when executed by the processor, cause the processor to:
    rank the first set of predicted 2D bounding boxes based on the confidence scores, and
    select the first subset from the first set of predicted 2D bounding boxes, wherein the first subset includes the predicted 2D bounding boxes of the first set having confidence scores that satisfy a predefined threshold.

4. The system of claim 1, wherein the training set generation module further includes instructions that, when executed by the processor, cause the processor to:
    rank the second set of predicted 2D bounding boxes based on the confidence scores, and
    select the second subset from the second set of predicted 2D bounding boxes, wherein the second subset includes the predicted 2D bounding boxes of the second set having confidence scores that satisfy a predefined threshold.

5. The system of claim 1, wherein the training set generation module further includes instructions that, when executed by the processor, cause the processor to provide the model a threshold value, wherein the model outputs predicted 2D bounding boxes that satisfy the threshold value.

6. The system of claim 1, wherein the 3D bounding boxes were generated based on information captured from a LIDAR sensor of a scene having the objects.

7. The system of claim 1, wherein the confidence scores indicate a likelihood that objects are defined by the predicted 2D bounding boxes.

8. The system of claim 1, wherein the training set generation module further includes instructions that, when executed by the processor, cause the processor to draw axis-aligned bounding boxes that encapsulate corners of the 3D bounding boxes to generate the 2D bounding boxes.

9. A method comprising steps of:
    generating 2D bounding boxes of objects in an image based on a master set of 3D bounding boxes of the objects;
    training a model using the image as an input and the 2D bounding boxes as ground truths, wherein the model outputs a first set of predicted 2D bounding boxes and confidence scores for the first set of predicted 2D bounding boxes;
    selecting, based on the confidence scores for the first set of predicted 2D bounding boxes, a first subset from the first set of predicted 2D bounding boxes;
    retraining the model using the image as the input and the first subset as ground truths, wherein the model outputs a second set of predicted 2D bounding boxes and confidence scores for the second set of predicted 2D bounding boxes;
    selecting, based on the confidence scores for the second set of predicted 2D bounding boxes, a second subset of predicted 2D bounding boxes from the second set of predicted 2D bounding boxes; and
    generating a training set by selecting the 3D bounding boxes from the master set of 3D bounding boxes that have corresponding 2D bounding boxes that form the second subset.

10. The method of claim 9, further comprising the step of projecting the 3D bounding boxes of the objects onto an image plane of the image to generate the 2D bounding boxes of the objects.

11. The method of claim 9, further comprising the steps of:
    ranking the first set of predicted 2D bounding boxes based on the confidence scores; and
    selecting the first subset from the first set of predicted 2D bounding boxes, wherein the first subset includes the predicted 2D bounding boxes of the first set having confidence scores that satisfy a predefined threshold.

12. The method of claim 9, further comprising the steps of:
    ranking the second set of predicted 2D bounding boxes based on the confidence scores; and
    selecting the second subset from the second set of predicted 2D bounding boxes, wherein the second subset includes the predicted 2D bounding boxes of the second set having confidence scores that satisfy a predefined threshold.

13. The method of claim 9, further comprising the step of providing the model a threshold value, wherein the model outputs predicted 2D bounding boxes that satisfy the threshold value.

14. The method of claim 9, wherein the 3D bounding boxes were generated based on information captured from a LIDAR sensor of a scene having the objects.

15. The method of claim 9, wherein the confidence scores indicate a likelihood that objects are defined by the predicted 2D bounding boxes.

16. The method of claim 9, further comprising the step of drawing axis-aligned bounding boxes that encapsulate corners of the 3D bounding boxes to generate the 2D bounding boxes.

17. A method comprising steps of:
- training a model using an image as an input and 2D bounding boxes that are based on a master set of 3D bounding boxes as ground truths, wherein the model outputs a set of predicted 2D bounding boxes and confidence scores for the set of predicted 2D bounding boxes;
- selecting, based on the confidence scores for the set of predicted 2D bounding boxes, a subset from the set of predicted 2D bounding boxes; and
- generating a training set by selecting the 3D bounding boxes from the master set of 3D bounding boxes that have corresponding 2D bounding boxes that form the subset.

18. The method of claim 17, further comprising the step of providing the model a threshold value, wherein the model outputs predicted 2D bounding boxes that satisfy the threshold value.

19. The method of claim 17, wherein the confidence scores indicate a likelihood that objects are defined by the predicted 2D bounding boxes.

20. The method of claim 17, further comprising the step of drawing axis-aligned bounding boxes that encapsulate corners of the 3D bounding boxes of the master set to generate the 2D bounding boxes.

* * * * *